Sept. 3, 1929. S. H. WISMER 1,726,601
ELECTRICALLY WOUND SPRING MOTOR
Filed Nov. 28, 1925 2 Sheets-Sheet 2
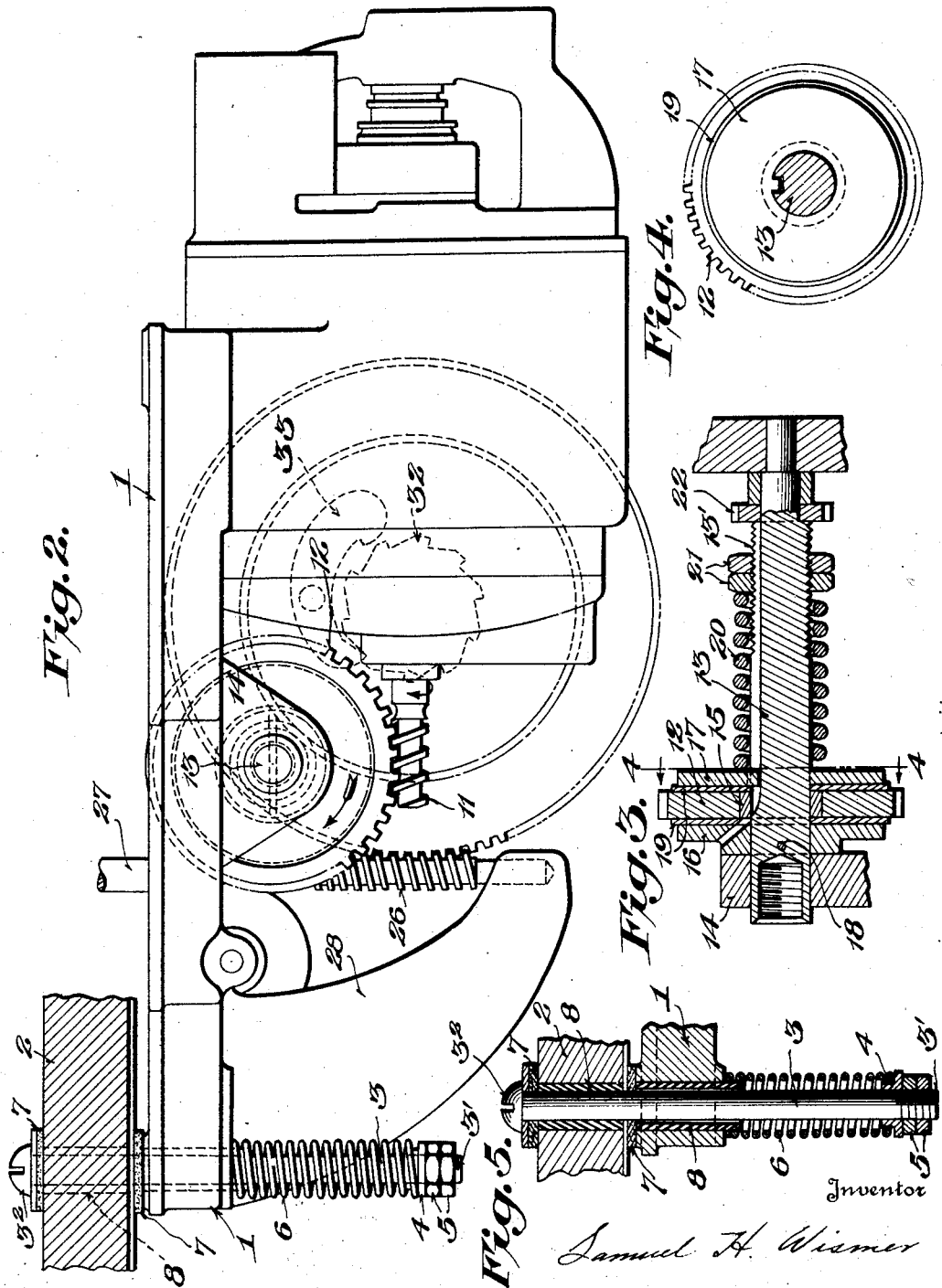

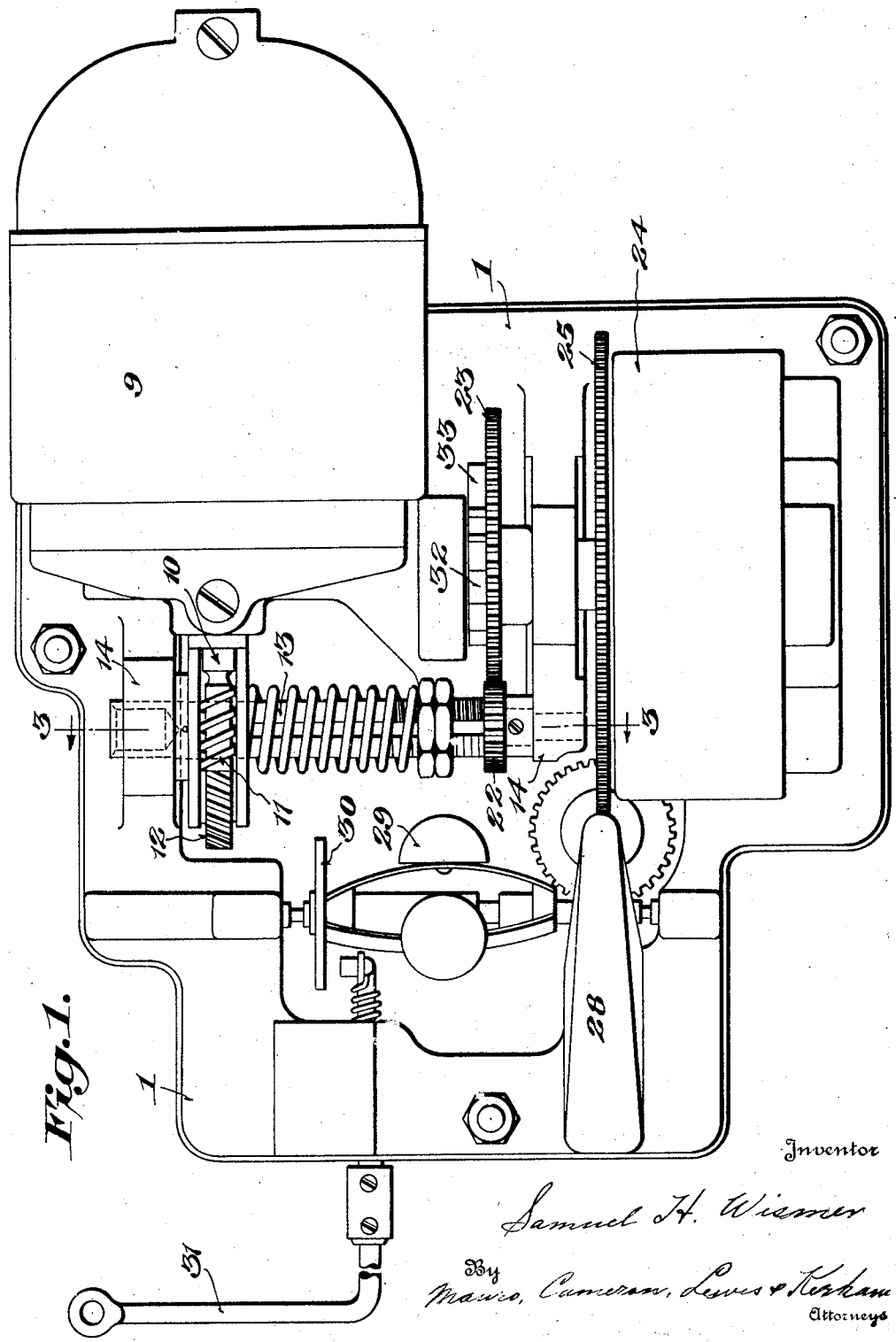

Patented Sept. 3, 1929.

1,726,601

UNITED STATES PATENT OFFICE.

SAMUEL H. WISMER, OF PALMYRA, NEW JERSEY, ASSIGNOR TO VICTOR TALKING MACHINE COMPANY, A CORPORATION OF NEW JERSEY.

ELECTRICALLY-WOUND SPRING MOTOR.

Application filed November 28, 1925. Serial No. 72,019.

This invention relates to electrically wound spring motors, particularly spring motors for talking machines.

It has heretofore been proposed to automatically wind the spring motor of a talking machine by automatically connecting the spring motor to an electric motor. Such devices have been unsatisfactory since they require means for stopping the electric motor after the spring of the spring motor has been wound to a certain degree of tension, thereby complicating the structure; or, if the electric motor is continuously operated, it has been found necessary to provide positive clutch means, such as toothed members, in combination with apparatus for positively engaging and disengaging the elements of the clutch, and devices for preventing counter rotation of the spring motor winding spindle.

An object of the present invention is to provide a novel electrically wound spring motor which is so constructed that the electric winding motor may be continuously operated.

Another object is to provide means for operatively connecting the electric and spring motors which is continuously in engagement and does not require the use of complicated mechanism for engaging and disengaging the same in order to prevent too great a tension being placed on the spring of the spring motor.

Another object of the present invention is to provide novel means for controlling within predetermined limits, the tension that may be placed on the motor spring.

A further object is to embody in a very simple structure a novel combination of elements embodying means for transmitting power from the electric motor to the winding spindle of the spring motor.

Another object of the invention is to provide an apparatus of the class described which is so constructed and operated that a spring motor of the type now in common use may be employed.

The invention will be readily understood by reference to the accompanying drawings, together with the following detailed description, which drawings illustrate one embodiment of the inventive idea. It is to be expressly understood, however, that the drawings are for purposes of illustration only and are not designed as a definition of the limits of the invention, reference being had to the appended claims for this purpose.

In the drawings,

Figure 1 is a bottom plan view of the combination of elements constituting the subject matter of the present invention;

Figure 2 is a side elevation of the apparatus shown in Fig. 1 and illustrating the same as being resiliently mounted on a support, the latter being shown in section;

Figure 3 is a detail sectional view taken on the line 3—3 of Fig. 1;

Figure 4 is a section on the line 4—4 of Fig. 3; and

Figure 5 is a detail sectional view illustrating one type of resilient mounting which may be employed.

Referring to the drawings, wherein like reference characters refer to like parts throughout the several views, the elements of the combination constituting the present invention are suitably mounted on a frame or base plate 1 which may be secured in any suitable manner to a support such as the motor board 2 (Fig. 2) of a talking machine.

Due to the vibration which usually results from the operation of small electric motors, it is desirable that resilient means be employed for securing the motor elements to the motor board. Accordingly, the base plate 1 is preferably secured to the motor board 2 by means of a suitable number of resilient connecting members of the type illustrated in Figs. 2 and 5. Preferably, each of these supporting members is constituted by a bolt 3 provided with a long shank which extends through registering openings in the motor board and the base plate, said bolt being threaded on its lower end as at 3'. Interposed between the lower surface of the base plate 1 and an annular shouldered member 4, which is held in place on the bolt 3 by means of lock nuts 5, is a coil spring 6 which surrounds the shank of the bolt 3 and thus yieldingly maintains the base plate 1 in engagement with the lower surface of the motor board. Preferably, washers 7 formed of suitable material, such as felt, are interposed between the head $3^2$ of the bolt and the motor board and also between the lower surface of the motor board and the upper surface of the base plate 1. If desired, bushings 8 of suitable material such as rubber, may be positioned in the openings in the motor board and base plate through which the bolts pass to protect these elements against wear and frictional noises. It will be understood that any suitable number of these resilient or yielding supporting members may be employed for securing the spring and electric motors and elements associated therewith to the motor board. The specific details of the resilient mounting for the motor elements constitute no part of the present invention.

Suitably secured to the lower surface of the base plate 1 is an electric motor 9 provided with a driving shaft 10. A worm 11 is positioned on the end of said driving shaft 10, or formed integrally therewith, which worm engages a worm wheel 12 which is mounted on a shaft 13, that is disposed at substantially right angles to the driving shaft 10 of the motor 9, and is rotatably mounted on the base plate 1 by means of suitable brackets 14 depending downwardly from the latter. As shown more clearly in Fig. 3, the worm gear 12 is mounted for free rotation on the shaft 13 and if desired, a bushing 15 may be interposed between said shaft and worm wheel.

Mounted on the shaft 13 on opposite sides of the worm wheel 12 and in frictional engagement therewith, are collars 16 and 17. As shown, collar 16 is rigidly secured to the shaft 13, as by means of a pin 18, while the collar 17 is preferably splined to the shaft 13 for longitudinal movement therealong. Suitable friction disks 19 are preferably floated on shaft 13 between the opposite faces of worm gear 12 and the inner faces of collars 16, 17.

Means are preferably provided whereby the frictional engagement between collars 16, 17 and the worm wheel 12, may be adjusted. As shown, this means comprises a coil spring 20 which surrounds shaft 13 and which bears at one end against the collar 17, and at its opposite ends against lock nuts 21 which are positioned on the threaded portion 13' of the shaft 13. Longitudinal adjustment of the lock nuts 21 varies the pressure of the spring 20 on the collar 17 and consequently the frictional engagement of the three elements 12, 16 and 17, constituting the clutch.

Rigidly secured on the shaft 13 adjacent the threaded end thereof, is a pinion 22 which has driving engagement with a winding gear 23 rigidly attached to the winding shaft of the spring motor 24. The latter may be of any suitable and well known type and is provided with the usual driving worm gear 25 which is actuated by the spring (not shown) of the motor.

In driving engagement with the worm gear 25 is a worm 26 which is secured to or formed integrally with the turn table spindle 27 that projects upwardly through suitable openings in the base plate 1 and motor board 2, and receives at the upper end thereof the record turn table (not shown). The lower end of the spindle 27 is suitably journaled in a bracket 28 which depends downwardly from the lower surface of the base plate 1. A centrifugal governor 29 of any suitable type may be operatively connected in the usual way to the motor spindle 27 to insure a constant rate of speed for the latter, and brake members 30 and 31 of any well known type, may be provided for manually stopping the rotation of the turn table.

Pawl and ratchet mechanism may be associated with the spring motor to prevent counter rotation of the spring barrel. For example, a ratchet wheel 32 may be suitably secured to gear 23 for coaction with a pawl 33 pivotally secured to the base plate 1, for this purpose.

*Operation.*—The electric motor 9 operates continuously and through the worm 11, worm wheel 12, collars 16, 17, friction disks 19, and gearing 22, 23 winds the spring of the motor 24. The latter in turn drives the turn table through gear 25, worm 26 and spindle 27. The friction between the worm gear 12, friction disks 19, and the collars 16, 17 is so adjusted, by means of spring 20 and lock nuts 21, that when the motor spring is wound to a certain tension, the worm wheel 12 will slip relative to the friction disks 19 or collars 16, 17 and power will not be transmitted from the electric motor to the winding shaft of the spring motor. Since the electric motor is continuously rotating, however, there is always a tendency for the worm gear 12 to drive the shaft 13 and this counteracts the tendency of the shaft 13 to rotate in a direction to permit the spring to unwind itself. If ratchet 32 and pawl 33 are employed these elements positively prevent counter rotation of shaft 13. As soon as the tension of the spring of the motor 24 has been relieved, by the expenditure of energy necessary to drive the turn table and as determined by the adjustment of the lock nuts 21, the frictional engagement of the clutch members again acts to transmit power from the electric motor to the winding shaft of the spring motor, until the spring of the latter is so tightly wound that its tension will cause slippage between the worm wheel 12 and the friction disks or collars 16, 17.

The frictional engagement of the clutch elements may be so adjusted by means of spring 20 and lock nuts 21 that the spring motor can be made to operate within narrow predetermined limits, thereby insuring a constant rate of rotation for the spring motor driving gear 25.

The mechanism is noiseless in operation, and relatively simple and rugged in construction. While the spring motor has been illustrated and described as being employed for rotating the turn table of a talking machine, it will be understood that the apparatus is adaptable to other uses, such for example as operating clock mechanism. Various changes may be made in the details of construction. For example, the number of friction disks and collars may be greately increased if desired. Reference will therefore be had to the appended claims for a definition of the invention.

What is claimed is:

1. In combination, a spring motor, a continuously running electric motor having a gear secured to the driving shaft thereof, means including a friction clutch for transmitting power from the electric motor to the spring motor to wind the latter, said friction clutch including as an element thereof, a gear in engagement with said first named gear, and means for positively preventing counter-rotation of the spring motor.

2. Apparatus of the class described comprising, in combination, a spring motor having a winding shaft, a driven shaft having driving connection with the casing of said motor, a continuously running electric motor having a driving shaft, motion transmitting means including a plurality of rigid friction elements operatively connected to said winding and driving shafts, a member having engagement with said driving shaft and one or more of said friction elements, and pawl and ratchet means for positively preventing counter-rotation of the spring motor winding shaft.

3. In combination with a motor board, a base plate, means for yieldingly securing the base plate to said board, a spring motor having a winding shaft secured to said plate, a continuously running electric motor secured to said plate and having a driving shaft, motion transmitting means including a plurality of friction elements operatively connected to said winding and driving shafts, a member having engagement with said driving shaft and one or more of said elements, resilient means for adjusting the frictional engagement between said member and friction elements and means for positively preventing counter-rotation of the spring motor winding shaft.

4. Apparatus of the class described comprising a spring motor adapted to run continuously while the machine is in operation, and means for maintaining the spring of said spring motor constantly within narrow predetermined limits of tension including an electric motor running continuously while said spring motor is in operation, and a slippage driving connection between said motors.

5. Apparatus of the class described comprising a spring motor adapted to run continuously while the machine is in operation, and means for maintainng the spring of said spring motor constantly within narrow predetermined limits of tension including an electric motor running continuously while said spring motor is in operation, and resiliently engaged friction elements between said motors.

6. Apparatus of the class described comprising a spring motor adapted to run continuously while the machine is in operation, means for maintaining the spring of said spring motor constantly within narrow predetermined limits of tension including an electric motor running continuously while said spring motor is in operation, friction elements operatively connected to said motors, and resilient means for maintaining said elements in engagement, and means for adjusting the tension of said resilient means to vary said limits.

7. Apparatus of the class described comprising a spring motor adapted to run continuously while the machine is in operation, and means for maintaining the spring of said spring motor constantly within narrow predetermined limits of tension, said means including an electric motor running continuously while said spring motor is in operation, a gear driven by said electric motor, a shaft carrying said gear, friction elements slidable longitudinally on said shaft and adapted to frictionally engage said gear, and a spring maintaining said elements in engagement with said gear.

8. Apparatus of the class described comprising a spring motor adapted to run continuously while the machine is in operation, means for maintaining the spring of said spring motor constantly within narrow predetermined limits of tension, said means including an electric motor running continuously while said spring motor is in operation, a gear driven by said electric motor, a shaft carrying said gear, friction discs slidable longitudinally on said shaft, a coil spring maintaining said discs in frictional engagement with said gear, and means for adjusting the tension of said spring to vary said limits.

In testimony whereof I have signed this specification.

SAMUEL H. WISMER.